United States Patent [19]

Okajima

[11] 4,326,782
[45] Apr. 27, 1982

[54] SOUND MOTION PICTURE CAMERA CAPABLE OF OVERLAPPING EXPOSURES

[75] Inventor: Hidekazu Okajima, Tokyo, Japan

[73] Assignee: Canon Kabushiki Kaisha, Tokyo, Japan

[21] Appl. No.: 72,322

[22] Filed: Sep. 4, 1979

[30] Foreign Application Priority Data

Sep. 8, 1978 [JP] Japan .................. 53-111072

[51] Int. Cl.³ .................................. G03B 21/36
[52] U.S. Cl. .......................... 352/91 C; 352/5; 352/27
[58] Field of Search .......... 352/5, 27, 91 C, 91 S, 352/91 R

[56] References Cited

U.S. PATENT DOCUMENTS

| | | | |
|---|---|---|---|
| 1,844,672 | 2/1932 | Narath | 352/91 C |
| 1,889,840 | 12/1932 | Owens | 352/1 |
| 3,597,056 | 8/1971 | Sasaki | 352/12 |
| 3,957,363 | 5/1976 | Hayashi et al. | 352/27 |
| 4,000,940 | 1/1977 | Komine et al. | 352/27 |
| 4,150,884 | 4/1979 | Reichen | 352/91 C |

FOREIGN PATENT DOCUMENTS

52-38934  3/1977  Japan .................. 352/27

*Primary Examiner*—Monroe H. Hayes
*Attorney, Agent, or Firm*—Toren, McGeady & Stanger

[57] ABSTRACT

A sound motion picture camera capable of overlapping exposures by automatically controlling the sequence of a first step beginning with stopping of the take-up spool in a film cassette from further rotation in response to initiation of an overlapping exposure operation and terminating with a predetermined length of film being accumulated in the cassette in the form of a slack loop, a second step of rewinding the length of the looped film without further exposing the film and a third step of transporting the rewound film in the forward direction again while exposing the film again, characterized by the provision of control means for allowing release of a head pad from pressure contact against the magnetic head when the above second step starts.

1 Claim, 8 Drawing Figures

SOUND MOTION PICTURE CAMERA CAPABLE OF OVERLAPPING EXPOSURES

DETAILED DESCRIPTION

This invention relates to sound motion picture cameras capable of overlapping exposures.

It is known in the art to provide a sound motion picture camera capable of selectively using a silent film cassette containing a silent film on which only pictures can be optically recorded and a sound film cassette containing a sound film on which pictures can be optically recorded with sound accompaniments which are magnetically recorded thereon. It is also known to provide a sound motion picture camera capable of overlapping film exposures in three steps: the first step where the film is transported in a forward direction past the exposure aperture while the take-up spool is at a standstill, the withdrawn length of film forming a slack loop in the interior of the cassette casing; the second step where the film is transported backwards past the exposure aperture but without exposing it; and the third step where the rewound film is transported in the forward direction again. Almost all of the conventional sound motion picture cameras of the character described above employ different operating members for the above-described different steps. The requirement of selectively actuating either one of the operating members for each step, however, leads to complexity of operation and is, therefore, unfavourable to the user. To eliminate this problem, an attempt has been made by providing a mechanical type program device for automatically performing all the steps in sequence, with the resultant operating procedure being simplified. The use of this conventional mechanical type program device in a sound motion picture camera, however, because of the complicated structure of the program device and all the components thereof being mechanically assembled, provides not only an increase in bulk and weight of the camera as a whole, but also an increase in the possibility of damage due to the mechanical arrangement. As a means of solving these problems it is proposed that the above-described program be performed not mechanically but electrically, as disclosed in U.S. patent application Ser. No. 929,240, filed July 31, 1978. According to this proposal, a sound motion picture camera capable of overlapping exposures is improved with respect not only to the reduction in bulk and weight of the camera body, but also to the reliability of the overlapping mechanism.

With the camera of the above-identified Patent Application, when the cover of the cassette chamber is closed, a pinch roller is moved from an idle position to a preparatory position, and, at the same time, a head pad is brought into operative engagement with a magnetic head from a reset position. Then, when a trigger is depressed, an electromagnetic actuator is rendered operative, bringing the pinch roller from the preparatory position to an active position. It should be noted here that when the overlapping operation proceeds from the first to the second step, the above-described pinch roller is returned to the above-described preparatory position, while the above-described head pad is maintained in the active position.

In transporting the film backwards in the second step of the overlapping process, that is, rewinding the film, however, besides the essential requirement of removing the pinch roller from pressing the film against the capstan, it is required that the head pad also surely be released from constraint with the magnetic head, or otherwise an excessive load will be applied to the film with the possible occurrence of damage such as breakage of the film, injury of the film advancing claw, burning of the motor winding due to overload, and excessive current consumption. Therefore, the overlapping operation can be no longer performed, and the camera itself may no longer be usable.

With the foregoing in mind, an object of the present invention is to provide a sound motion picture camera capable of overlapping exposures automatically with very simple construction rendering it possible to relieve the pinch roller and head pad out from pressing the film against the capstan and magnetic head with high reliability when the above-described overlapping exposure process begins the second step, i.e. when the film loop is rewound.

In the following, the present invention will be described with respect to a preferred embodiment thereof in conjunction with the accompanying drawings:

FIG. 1 shows an external appearance of a sound motion picture camera capable of overlapping exposures according to the present invention wherein

Figure 1A:
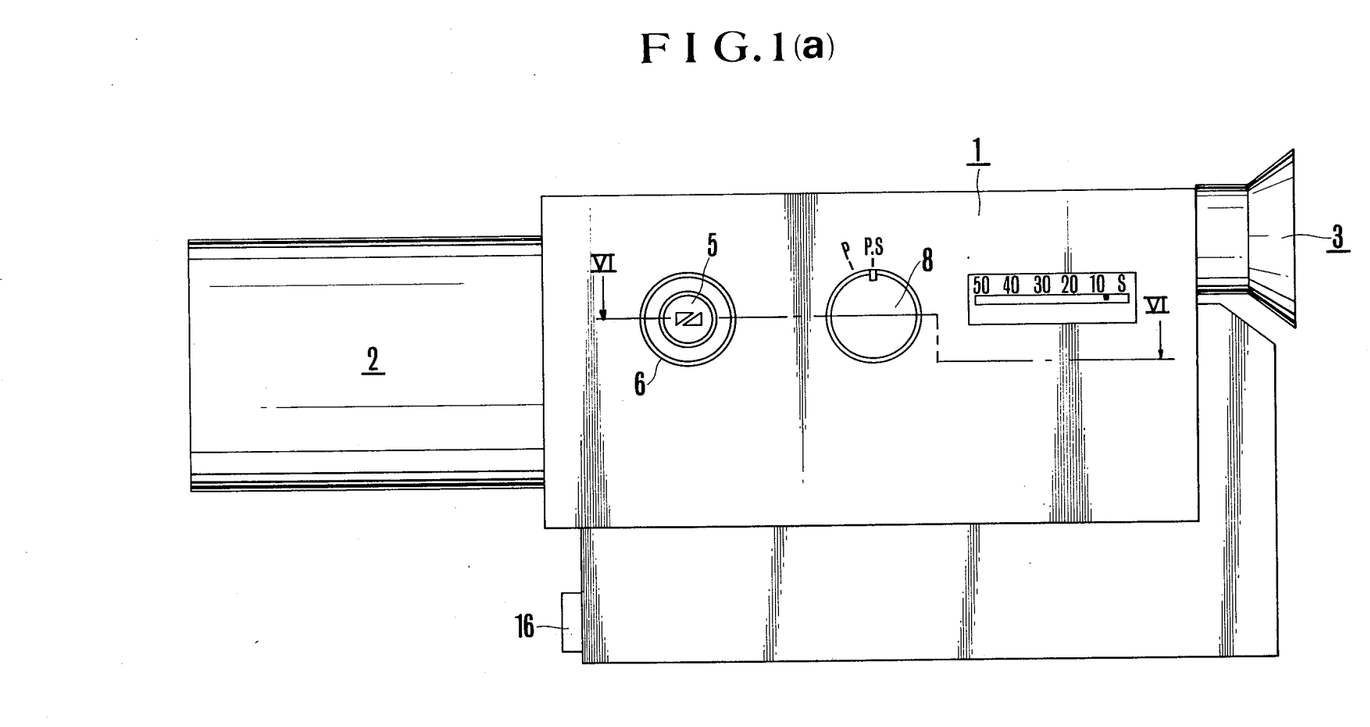
FIG. 1a is a side elevation as seen from an operator's left hand side.
Figure 1B:
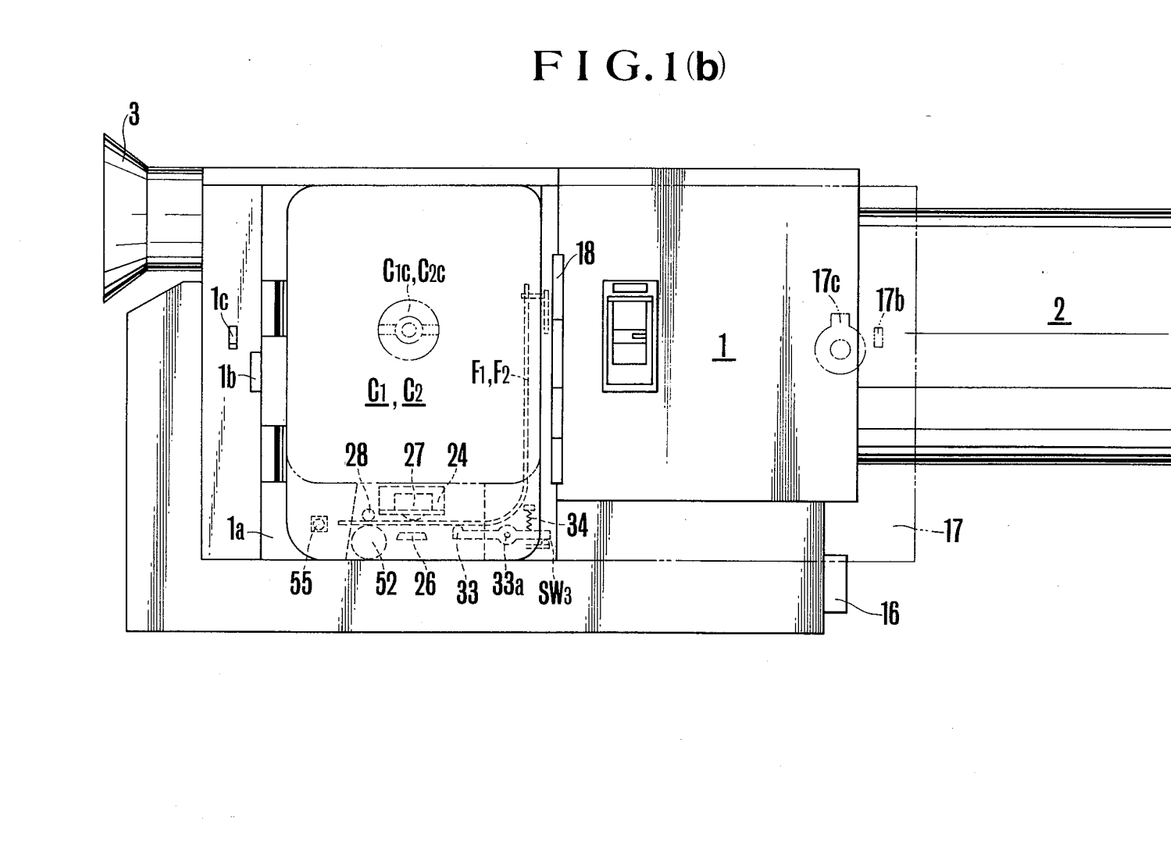
FIG. 1(b) is a side elevation as seen from an operator's right hand side with the cover of the cassette chamber opened.
Figure 6:
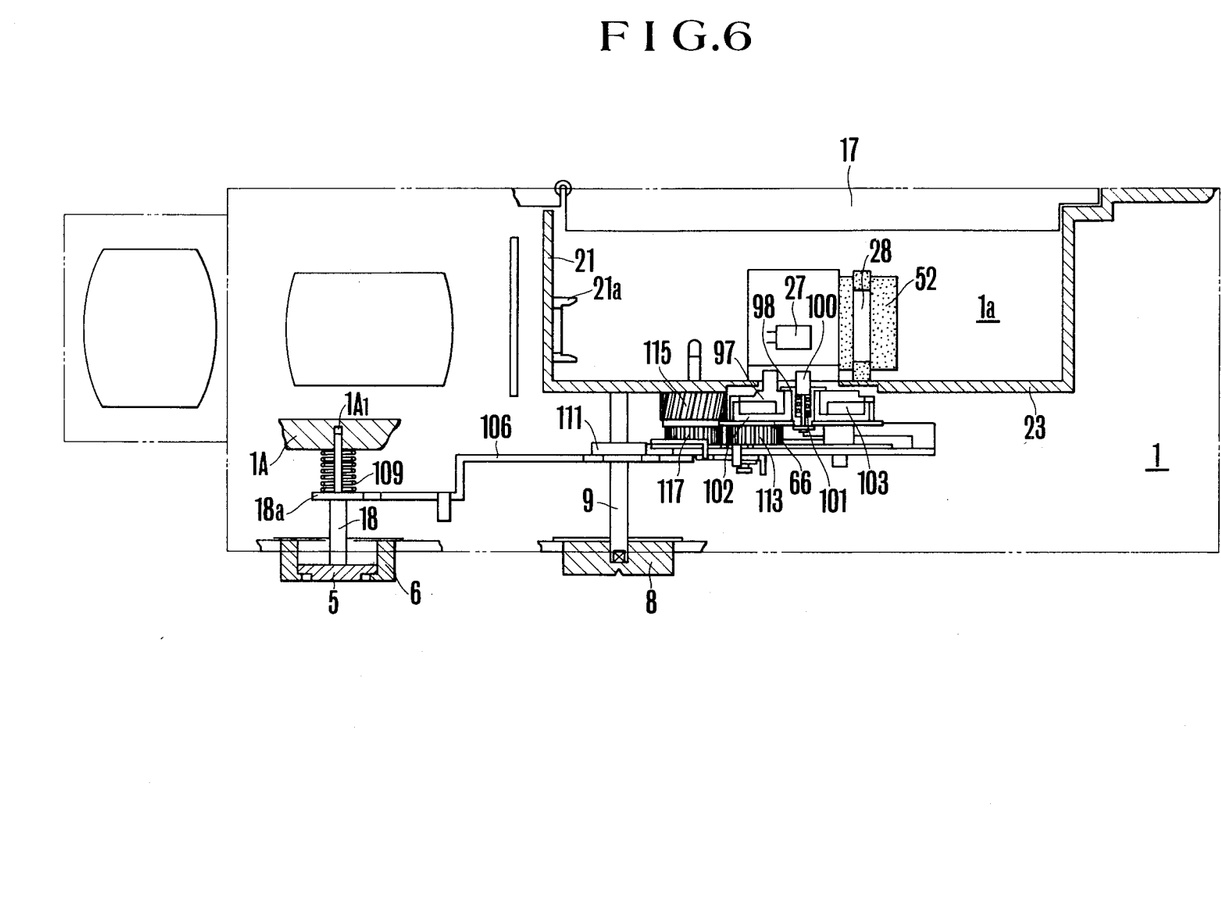
FIG. 6 is a sectional view taken along VI—VI line of FIG. 1(a).
Figure 7:
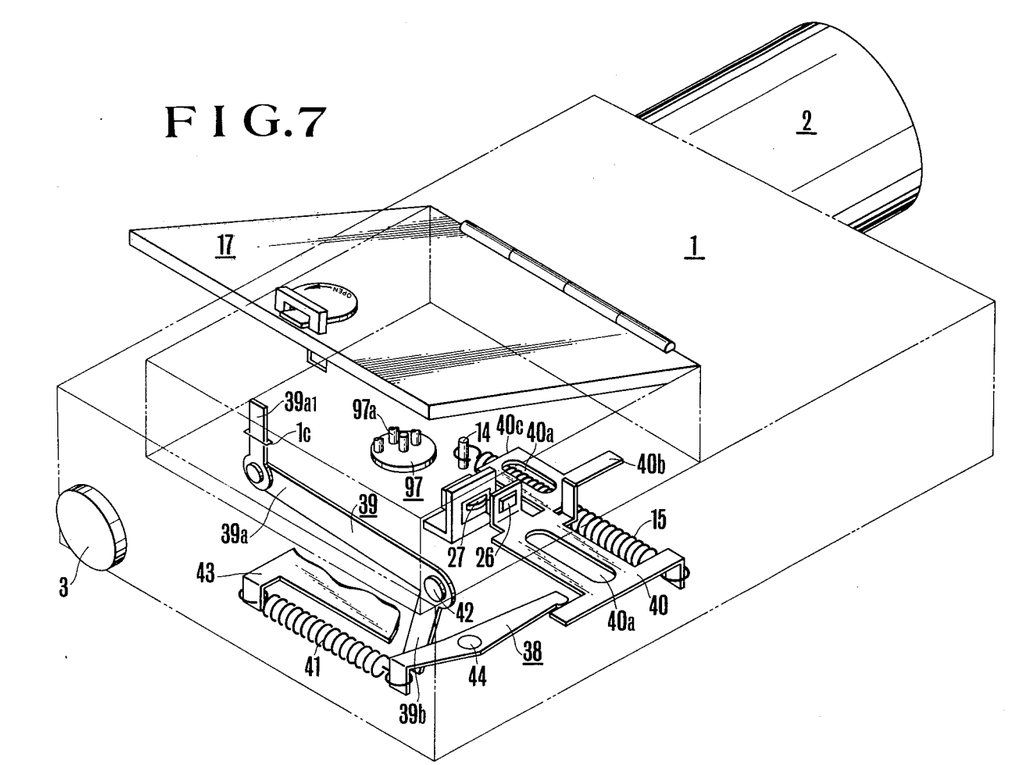
FIG. 7 is a perspective view of the head pad carrier mechanism shown in FIGS. 1 to 6.

One embodiment of the sound motion picture camera according to the present invention will be described in detail below. In FIGS. 1, 6 and 7, 1 is a camera housing; 1a is a cassette receiving chamber formed in the interior of the camera housing; 2 is an objective lens mount fixed to the front panel of the camera housing 1; 3 is an eyecap fixedly secured to a view finder of the camera; 5 is a button for actuating overlapping exposure operation, the button 5 being slidingly movably fitted in a tubular knob 6 which is mounted on the left hand side panel of the camera housing 1. Button 5 is fixed to one end of a shaft 18 which is slidingly movably fitted in a hole formed in a part 1A of the camera housing 1. The other end of the shaft 18 is slidably arranged in a hole 1A$_1$ of the above-described part 1A. Shaft 18 is urged outwardly of the camera housing 1 by a compressed spring 109 positioned between the part 1A of the camera housing 1 and a flange 18a formed integrally with the shaft 18. 8 is a mode changeover control ring fixed to one end of a shaft 9 which is rotatably supported by the bottom wall of the cassette chamber 1a as viewed in FIG. 6. Shaft 9 fixedly carries a flange 111 having a cutout 111a (FIG. 3) formed in a part thereof. The ring 8 is associated with a rotary switch mechanism (not shown) responsive to rotation of the ring for establishing one of a number of switched positions, and on the ring 8 there is provided an index 8a to align with symbols "S", "P" and "PS" on the external surface of the camera housing 1 as shown in FIG. 1(a). 16 is a trigger button. In FIG. 7, 17 is a cover for selectively covering and uncovering the above-described cassette chamber 1a, the cover 17 being secured to the camera housing through a hinge 18. In cover 17 there is a display window 17a (FIG. 1(b)) for viewing whether or not a film cassette is loaded in the above-described cassette chamber 1a from the outside of the camera, and a projected portion 17b on the inner surface of the wall thereof. On the outer wall surface of the cover 17, there is provided a rotary knob, not shown, for locking the cover 17 in a closed position. The rotary knob is connected through a shaft (not shown) to a pawl disc or key 17c on the inner surface of the cover wall, and the key 17c is arranged upon rotation by the knob to engage in or disengage from a key lock 1b formed in a portion of the camera housing 1. A front panel 21 of the cassette chamber housing is provided with a film gate plate 21a having an open aperture which registers with the window of a silent or sound film cassette C1 or C2 containing a silent film F1 or a sound film F2 respectively when these cassettes C1 and C2 are selectively inserted into the chamber 1a. 55 is a cassette type sensing probe extending through and inwardly of said panel 23 of the chamber housing. The sound motion picture camera of the present invention has the feature of allowing either one of the above-described silent film cassette C1 and sound film cassette C2 to be selected for use. When the silent film cassette C1 is selected, it is required to properly insert the silent film cassette C1 into the film chamber 1a as shown by a two dot chain line in FIG. 1(b). When the sound film cassette C2 is selected, its position in film chamber 1a is shown by a solid line. The adjustment in position of the film cassette C1 or C2 with reference to the film chamber 1a is made by a member 24 extending from the above-described side panel 23. That is, when the film cassette C1 is loaded in the chamber 1a, it occupies the part of the space in the chamber which is above the position adjusting member 24. When the film cassette C2 is loaded in the chamber 1a, the position adjusting member 24 is received in a cutout of the cassette C2, the body of the cassette C2 extending downwardly beyond the member 24. The silent film cassette C1 accommodates a film supply reel and a take-up reel in coaxial relation to each other so that the above-described silent film F1 from the supply reel is caused to pass along the inner side of the above-described exposure aperature or window to be convoluted on the take-up reel. On the other hand, in the sound film cassette C2, the sound film F2 is advanced from the exposure aperture window to the above-described cutout, as it is transported from the supply to the take-up reel. The film F2 has a magnetic recording track on one surface thereof in the vicinity of a side edge.

Figure 2:
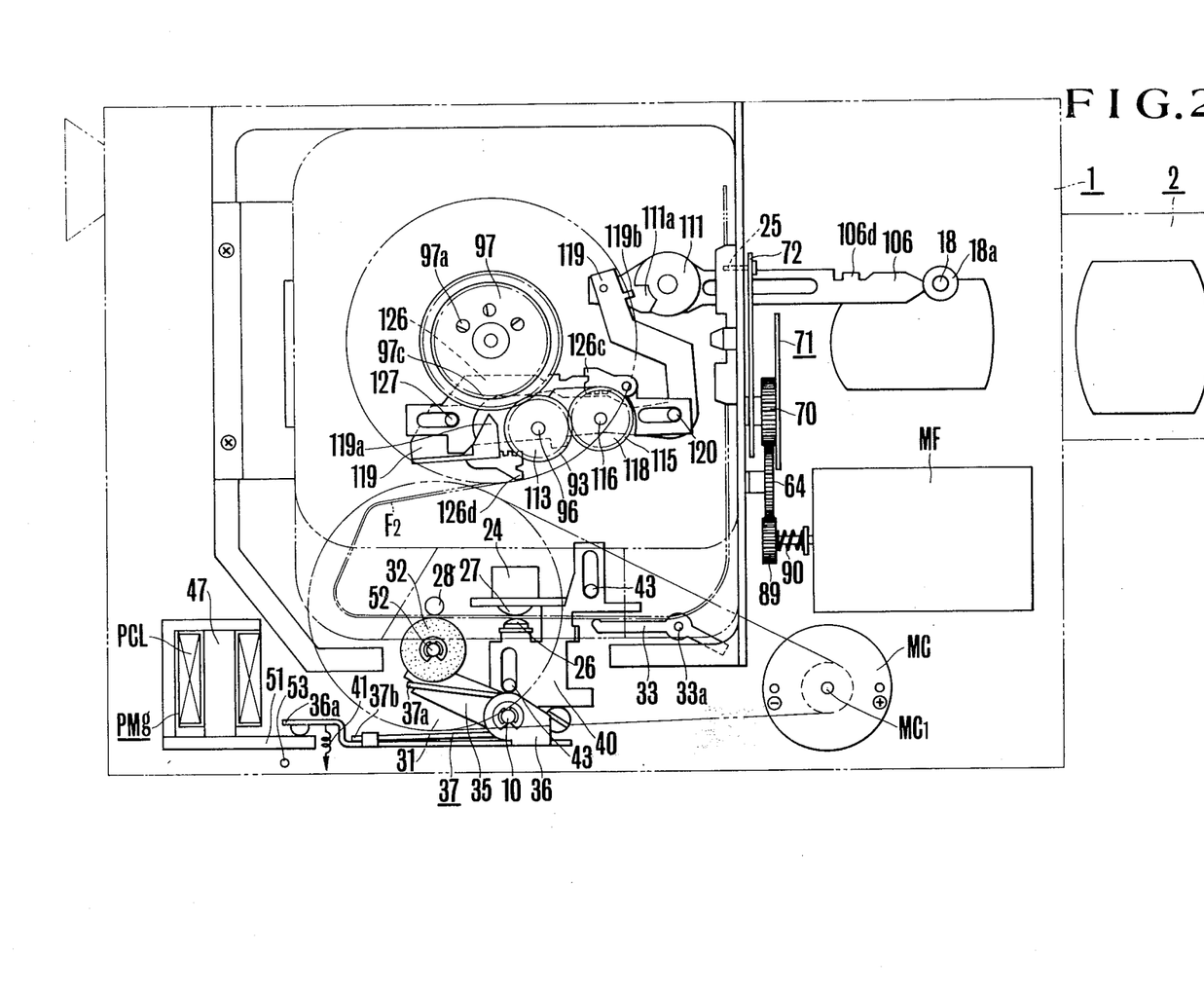
FIG. 2 is a side elevational interior view showing the construction and arrangement of the mechanical components in the camera of FIG. 1.
Figure 3:
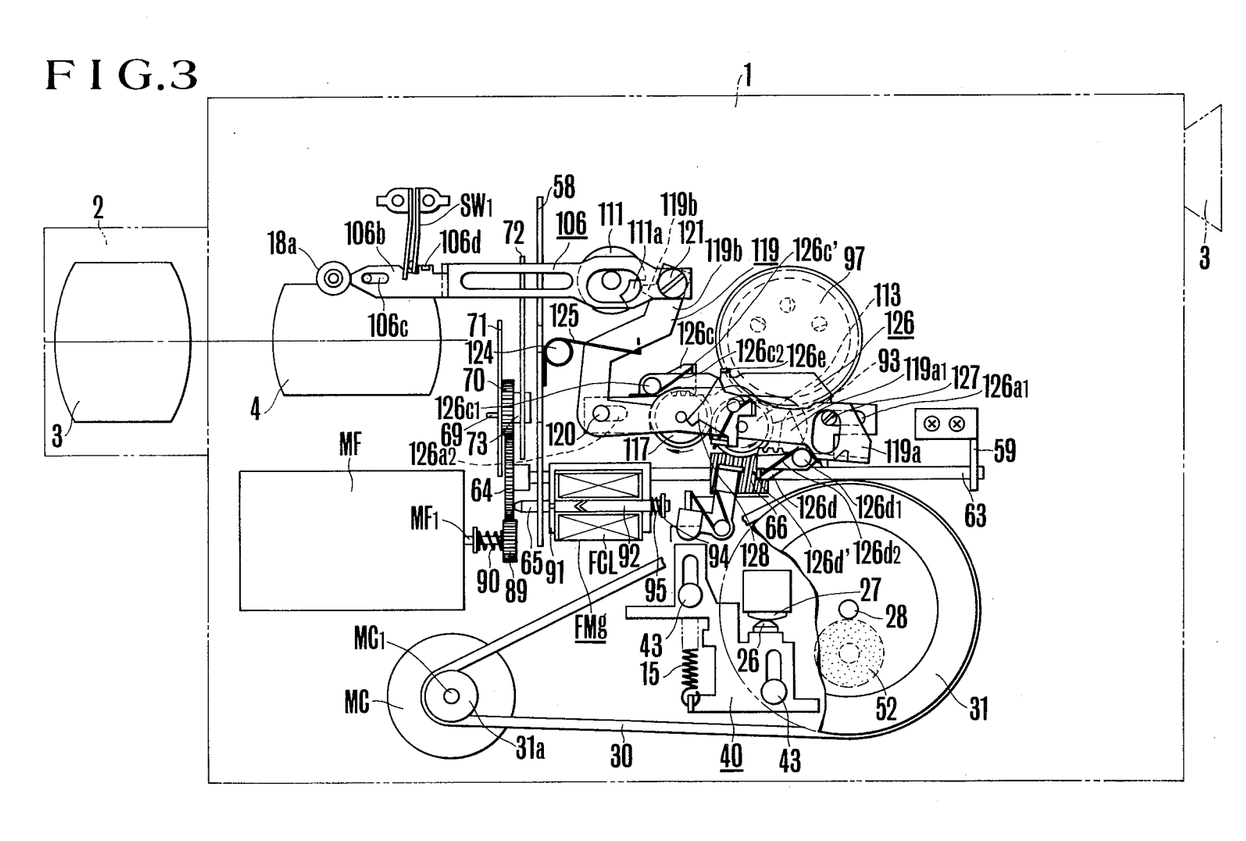
FIGS. 3 to 5 are side elevational views of an overlapping exposure control apparatus of the sound motion picture camera according to the present invention shown in FIGS. 1 and 2.

In FIG. 2, a film pull down claw 25 enters through the opening of the exposure aperture window of the above-described cassette C1 or C2 loaded in the chamber 1a and intermittently engages in the perforations of the film F1 or F2 to advance the film F1 or F2 downwardly past a picture recording station. This claw 25 is driven by means known in the art. A head pad 26 is positioned on the opposite side of the film relative to a magnetic head 27 which is supported by the above-described position adjusting member 24 in a sound recording station of the above-described chamber 1a. A capstan 28 is arranged in the above-described sound recording station, the capstan 28 being rotatably supported by the camera housing 1 and being restrained from axial movement. The capstan 28 is provided with a fly wheel 31 at the opposite end thereof. As shown in FIG. 3, capstan 28 is driven to rotate at an almost constant speed by an endless belt 30 trained between a pulley provided on the above-described fly wheel 31 and a pulley 31a fixedly mounted on the output shaft of a motor MC which is fixedly mounted on the camera housing and which is controlled to maintain a constant speed. A pinch roller 32 forms part of a mechanism for continuously transporting the above-described film F2 at an almost constant speed past the sound recording station. The pinch roller 32 is arranged opposite to the above-described capstan 28 across the film path in the sound recording station. A loop detecting member 33 is arranged in contact with the film F2 between the film gate plate 21a and the magnetic head 27 to detect the length of film loop therebetween, the member 33 being pivoted at a shaft 33a fixedly mounted on the camera housing 1 and being urged in a clockwise direction by a compression spring 34. SW3 is a normally closed type switch of which the opening and closing operation is controlled by the above-described loop detecting member 33. PMg is an electromagnetic device. A displacement member 36 is rotatably supported at a shaft 10 which is fixedly mounted on the camera housing, the displacement member 36 being always urged to rotate in a counterclockwise direction by a tension spring 41. A pinch roller carrier lever 35 is also rotatably mounted on the shaft 10 and has a shaft 52 extending therefrom about which the pinch roller 32 rotates. The levers 35 and 36 are urged by a spring 37 to move away from each other, and constrained by engagement of their parts from expanding to more than a predetermined angle with respect to each other. The electromagnetic device PMg is fixedly mounted on the camera body 1, and has a stationary iron core 47, and an iron piece 51, pivotally mounted relative to the iron core 47, the iron piece 51 being arranged to be engageable with the free end 36a of the displacement member 36. A pin 53 limits the amount of displacement of the iron piece 51 arranged on the above-described camera housing 1 to abut the iron piece 51. These parts, namely, the electromagnetic device PMg, and displacement members 35 and 36 constitute a pinch roller control mechanism having three different operative positions, that is, an idle position where the above-described pinch roller 52 is separated from the capstan by a relatively large distance, a preparatory position where the pinch roller 52 is maintained slightly spaced from the capstan 28, and an active position where the pinch roller 52 presses the film F2 against the capstan 28. The pinch roller control mechanism cooperates with the chamber cover 17 in such a manner that when the cover 17 is open, the displacement members 35 and 36 assume an extreme counterclockwise position, or the idle position under the action of the spring 41, and, because the electromagnetic device PMg is not energized in this position, the iron piece 51 is in abutting engagement against the pin 53 under the action of the displacement member 36. After the sound film cassette C2 is loaded in the chamber 1a, when the cover 17 is closed, the pinch roller displacing mechanism is brought into the above-described preparatory position. Then, when the trigger button 16 is depressed, magnetic coil PCL of the electromagnetic device PMg is energized, wherein the iron core 47 is magnetized to attract the iron piece 51 toward the above-described iron core 47, causing the iron piece 51 to pivot in the counterclockwise direction. By this counterclockwise movement of the iron piece 51, the pinch roller displacing mechanism is brought into the above-described active position.

Explanation will next be given to a mechanism for controlling the engagement and disengagement of the head pad 26 with the magnetic head 27. As shown in FIG. 7, the camera housing 1 is provided with a hole 1c arranged to register with the projection 17b (FIG. 1(b)) on the inner side of the cover 17 when the cover 17 is closed. Outwardly of this hole 1c extends a part of the head pad displacing mechanism for bringing the above-described head pad 26 into contact with the above-described magnetic head 27 and for releasing the head pad 26 therefrom. A rotary member of the head pad displacing mechanism is rotatable about a pin 42 fixedly mounted on the camera housing 1. Again, on one arm 39a of this rotary member 39 is fixedly mounted an extension 39a1, and the other arm 39b always abuts a rotary lever 38 rotatable about a pin 44 fixedly mounted on the camera housing. A tension spring 41 is connected at one end thereof to a fixed member 43 on the camera housing, and at the other end to one arm of the above-described rotary lever 38, always urging the rotary lever 38 in a clockwise direction. The above-described rotary member 39 also is urged in a clockwise direction by the spring 41, permitting the extension 39a1 to project out of the hole 1c when the cover 17 is opened. A head pad support member 40 is slidingly movable as pins 43 (FIG. 2) fixedly mounted on the camera housing 1 are engaged in elongated vertical slots 40a. A tension spring 15 is connected at one end thereof to a pin 14 fixedly mounted on the camera housing 1 and at the other end to a head pad support member 40 so as to always urge the head pad 26 in a direction to abut against the above-described magnetic head 27. The spring force of this spring 15 is relatively weaker than that of the spring 41.

The operation of this head pad displacing mechanism is as follows: When the above-described cover 17 is open, the tension force of the spring 41 which overcomes the tension force of the spring 15 causes the rotary members 38 and 39 to be maintained in their extreme clockwise positions where the extension 39a1 of the rotary member 39 fully projects out of the above-described hole 1c of the camera housing 1 as shown in FIG. 7, and where the head pad support member 40 assumes an extreme downward position as the above-described member 39 is turned in the clockwise direction. Thus, the above-described head pad 26 is spaced away from the magnetic head 27. Then, when the cover 17 is closed, the extension 39a1 of the rotary member 39 is pushed into engagement with the projection 17b of the cover, so that the rotary member 39 is turned in the counterclockwise direction. Such counterclockwise movement of the rotary member 39 causes counterclockwise movement of the rotary member 38 which abuts the opposite arm 39b of the rotary member 39 under the bias of the spring 41. Such counterclockwise movement of the rotary member 38 in turn causes the above-described head pad support member 40 to be moved upwards by the action of the spring 15 until the head pad 26 abuts against the magnetic head 27. As will be described later, at the start of the second step of the overlapping exposure operation, a downwardly directed force is exerted and applied to the above-described head pad support member 40 at the top end 40c thereof, so that even when the cover 17 remains closed, the head pad support member 40 is moved downwards independently of the rotary members 38, 39. Slots 40a are elongated to allow the support member to slide relative to the pins 43. Thus, it is possible to provide sufficient space between the magnetic head 27 and the head pad 26.

When the cover 17 is opened, as the force exerted to have turned the rotary member 39 to the extreme counterclockwise position is removed, and the tension force of the spring 41 overcomes the tension force of the spring 15, the rotary members 39 and 38 are turned in the clockwise direction while the head pad support member 40 is simultaneously displaced downwards to release the head pad 26 from pressing contact with the magnetic head 27.

It is to be noted that though the rotary members 38 and 39 have been described as controlling the head pad displacing device, they may be employed in controlling the movement of the pinch roller displacing device between idle and preparatory positions as will be seen by reference to the above-identified U.S. patent application Ser. No. 929,240.

In FIG. 3, behind an objective lens 3,4 there is shown a base plate 58 having an aperture opening 58a in alignment with the optical axis of the objective lens and also with the aperture 21a of the above-described film gate plate 21. A reversible electric motor MF is fixedly mounted on the camera housing, the driving torque of the motor MF being utilized in actuating the operation of a rotary shutter, a film winding mechanism, an overlapping mechanism and the pull-down claw 25.

A gear 89 is operatively connected to output shaft MF1 of the above-described motor MF through a slip clutch 90 which is known in the art. A rotary shaft 63 is rotatably supported by the base plate 58 and another base plate 59, the latter also being fixedly mounted on the camera housing 1. A gear 64 is fixed to the rotary shaft 63. The gear 64 is provided with a recessed portion formed in that surface thereof which faces the base plate 58 for receiving a stopper member 65 to restrain the gear 64 from rotation. The above-described gear 64 always meshes with the gear 89 on the motor shaft MF1. Also, in part of the rotary shaft 63 is fixed a worm gear 66.

A shutter shaft 69 is rotatably mounted on the camera housing 1; 71 is a shutter blade rotating in unison with the shutter shaft 69; 72 is an intermittent film advancement control member for controlling the operation of the film pull-down claw 25; 70 is a gear fixed to the shutter shaft 69 and always meshing with the above-described gear 64; 73 is a cam for controlling the film advancement control member 72, the cam 73 being fixed to the shutter shaft 69. Therefore, when the film transport drive motor MF is rotated, motion of the motor MF is transmitted through the gears 89 and 64 to the rotary shaft 63, causing the rotary shaft 63 to be rotated, and also causing the gear 70 to be rotated in meshing engagement with the gear 64, thus the shutter 71 and the intermittent film advancement control member 72 are driven to operate.

FMg is an electromagnetic device fixed to the base plate 58 and provided for stopping the operation of the above-described intermittent film advancing mechanism, shutter mechanism and the like, the electromagnetic device FMg comprising a magnetic coil FCL, a yoke 91, a movable iron core 92, a stopper shaft 65, a spring 95 and a linkage plate 94. The coil FCL is turned to a cylindrical form and is supported by the base plate 58 through an insulator. The iron core 92 is arranged in the interior of the cylindrical magnetic coil FCL to be slidingly movable. The stopper member 65 is arranged to be engageable in the detent recess 64b1 of the gear 64 and to be slidingly movable in a direction almost normal to the side face of the gear 64. One end of the movable iron core 92 and the stopper member 65 are linked to each other by the plate 94 so that they slidingly move in unison, and a spring 95 urges the iron core 92 and stopper member 65 to move away from the base plate 58. When in the farthest position, the stopper member 65 is no longer engageable in the detent recess. Then, when the coil FCL of the electromagnetic device FMg is excited with current to produce the resultant magnetization of the yoke 91, the movable iron core 92 is attracted by the yoke 91, thereby the stopper member 65 is caused to strike the gear 64 at the side face thereof against the force of the spring 95. As the gear 64 is rotated, when the recess 64b1 is aligned with the stopper member 65, the latter enters the recess 64b1 so that the gear 64 is stopped from further rotation. Thus, the stoppage of rotation of the gear 64 results in the stoppage of operation of the intermittent film advancement device as a matter of course, and also in the stoppage of the shutter and rotary shaft 63 from further rotation. Then, when the current supply to the magnetic coil FCL is cut off, the stopper member 65 and the movable iron core 92 are again returned by the action of the spring 95 to their farthest position from the base plate 58, thus permitting the gear 64 to rotate.

A gear 93 is rotatably mounted on a stationary shaft 96 (also see FIG. 2) which is fixed to the camera housing 1 and always meshing with the above-described worm gear 66. A take-up shaft 97 of approximately ring-like shape has a plurality of poles or rod-like projections 97a for engagement with the take-up reel of the above-described cassette, said take-up shaft extending in a part through an opening provided through the bottom wall 23 of the chamber 1a as viewed in FIG. 7 into the interior of the chamber 1a, and having a gear 97c formed in a portion thereof as shown in FIG. 2. As shown in FIG. 6, a tubular member 98 is fixedly supported by a base plate 99 fixed to the camera housing 1. In the interior of the member 98 are arranged a slidable pin 100 and a compression spring 101 urging said pin 100 always in a direction toward the interior of the chamber 1a. This pin 100 and the aforesaid spring 101 operate in such a manner, as is also described in detail in U.S. Pat. No. 3,860,195, that when the sound film cassette C2 of known construction having a releasable reverse rotation locking mechanism is loaded, its reverse rotation locking mechanism is released, while when the silent film cassette C1 of known construction having an unreleasable reverse rotation locking mechanism is loaded, the aforesaid pin 100 recedes from the interior of the chamber 1a. A gear 102 is arranged with a portion thereof between the internal periphery of the take-up shaft 97 and the external periphery of the tubular member 98, and rotatably supported by the tubular member 98, while the take-up shaft 97 is rotatably arranged on the gear 102.

Gear 102 always meshes with the gear 93, and the driving torque of the gear 102 is transmitted to the take-up shaft 97 through a friction member 103 of ring shape arranged between the gear 102 and the take-up shaft 97. A gear 113 is likewise rotatably mounted on the common shaft 96 of the gear 93. This gear 113 and the aforesaid gear 93 are operatively connected to each other through a one-way clutch of known construction. This one-way clutch is rendered effective when the gear 93 is rotated in a counterclockwise direction as viewed in FIGS. 3 to 5, so that motion of the gear 93 is transmitted to the gear 113. When the gear 93 is turned in a clockwise direction, a slipping effect is produced between the gear 93 and the clutch, not permitting the motion of the gear 93 to be transmitted to the gear 113. A gear 115 is rotatably mounted on a stationary shaft 116 fixedly mounted on the aforesaid bottom wall 23, the gear 115 always meshing with the gear 93. A gear 117 is rotatably mounted on the stationary shaft 116 of the gear 115. This gear and the gear 117 are operatively connected to each other through a one-way clutch of known construction. This one-way clutch is rendered effective when the gear 115 is rotated in a counterclockwise direction, the motion of the gear 115 being transmitted to the gear 117. When the gear 115 is rotated in a clockwise direction, the gear 115 slips relative to the clutch 118, so that the motion of the gear 115 is not transmitted to the gear 117.

Figure 4:
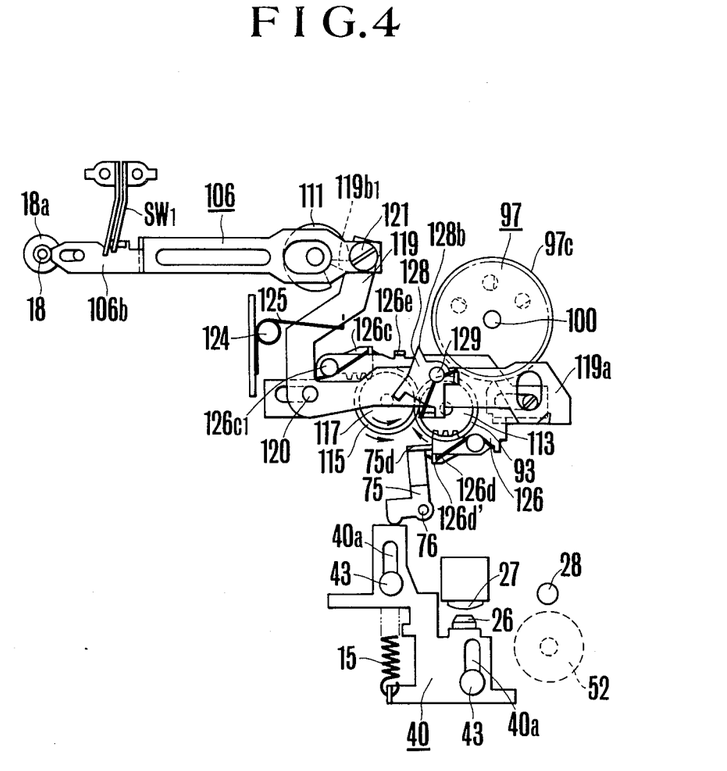
Figure 5:
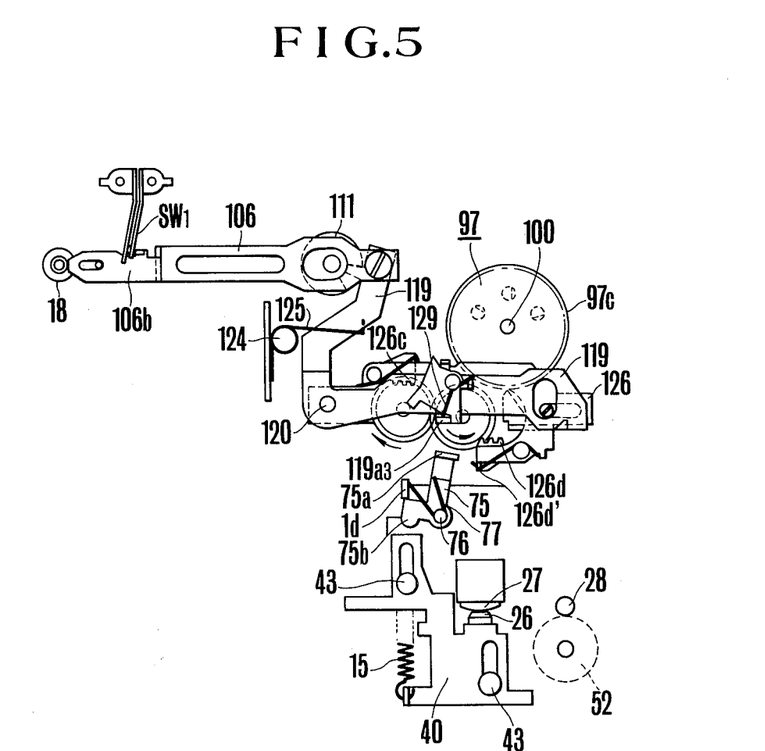

In FIGS. 4 and 5, a rotary member 119 is rotatably mounted on a shaft 120 which is fixedly mounted on the camera housing 1, the rotary member 119 having an engagement arm 119a with an engagement pawl 129a1 for temporarily stopping rotation of the aforesaid take-up shaft 97 in engagement with the toothed portion 97c when the rotary member 119 is rotated in the counterclockwise direction, and having a link arm 119b connected to the aforesaid slide 106 at one end 106a thereof through a pin 121. The rotary member 119 is urged by a spring 125 supported by a pin 124 which is planted on the camera housing 1 to turn about a shaft 120 in a counterclockwise direction. The above-described linking connection between the link arm 119b of the rotary member 119 and the slide 106 is effected by the engagement of the pin 121 planted on the link arm 119b. The link arm 119b is provided with an engagement portion 119b1 for engagement with a cutout 111a provided in the flange 111 of the above-described mode changeover ring 8. This engagement portion 119b1 and the cutout 111a of the aforesaid flange 111 are aligned to each other when the index 18 on the mode changeover control ring 8 is turned to the "P", or "P.S" position. The slide 106 is in a rightward displaced position as shown in FIG. 3 with one end 106b thereof on the flange 18a, when the above-described overlap exposure start button 5 is not depressed. When in this position, the engagement pawl 119a1 of the rotary member 119 is in a clockwise displaced position for disengagement from the toothed portion 97c. Again, when in this position, the engagement portion 119b1 is also placed in a position for disengagement from the cutout 111a of the flange 111. Then with the engagement portion 119b1 of the rotary member 119 and the cutout 111a of the flange 111 aligned to each other, when the overlap exposure start button 5 is depressed to move the slidable shaft 18 in a direction toward the interior of the camera against the force of the spring 109, the engagement of the flange 18a with the one end 106b of the slide 106 is released. Then, receiving the driving force of the spring 125 through the rotary member 119, the slide 106 is caused to move to the left as shown in FIGS. 4 and 5 in response to the counterclockwise rotation of the rotary member 119, thereby the engagement portion 119b1 of the rotary member 119 is engaged in the cutout 111a of the flange 111, and the end 106b of the slide 106 is brought into abutting engagement against the slidable shaft 18 at the circumferential surface thereof. At the same time, a projection 106d of the slide 106 closes the normally open type switch SW1, thus an actuating signal for the overlap exposure is fed to an overlap exposure control circuit through the switch SW1. This overlap exposure control circuit is disclosed in U.S. patent application Ser. No. 929,240 filed earlier. Since the upper surface of the flange 18a is suppressed by the end of the slide 106 after the slidable shaft 18 has been displaced toward the inside of the camera, the removal of the operator's finger from the button 5 does not cause the slidable shaft 18 to be returned. This state continues until the slide 106 is again displaced to the right as shown in FIG. 2, that is, the end 106b of the slide 106 is placed outside the flange 18a. The return of the slide 106 and the rotary member 119 occurs at a time during the overlap exposure operation.

As is clearly shown in FIG. 3, 126 is a displacement member of which the sliding movement is guided by the above-described shaft 120 and a shaft 127 fixed to the camera housing 1. This displacement member 126 is provided with a rack member 126c engageable with the above-described gear 117 and another rack member 126d engageable with the above-described gear 113. The aforesaid rack member 126c is pivoted at a pin 126c1 fixed to the displacement member 116 and is urged in a clockwise direction by a spring 126c2 as viewed in FIG. 3. The amount of clockwise movement of the rack member 126c is limited by the engagement of a bent portion 126c' thereof with the displacement member 126. On the other hand, the rack member 126d is pivoted at a pin 126d1 fixed to the displacement member 126 and is always urged by a spring 126d2 in a clockwise direction as viewed in FIG. 3. The amount of clockwise movement of the rack member 126d is limited by the engagement of a bent portion 126d' thereof with the displacement member 126. Now assuming that the displacement member 126 takes a leftmost position where the rack 126d meshes with the gear 113 as shown in FIG. 4, when the gear 93 is rotated in the counterclockwise direction, motion of this gear 93 is transmitted through the clutch mechanism to rotate the gear 113 also in the counterclockwise direction, and, therefore, the displacement member 126 is driven to move to the right as shown in FIG. 5 until the rack member 126c is brought into meshing engagement with the gear 117 and the other rack member 126d is taken out of the meshing engagement with the gear 113. In this case, even when the gear 117 and the rack member 126c are engaged with each other, as the motion of the gear 115 is not transmitted to the gear 117 because of the action of the clutch mechanism, no influence is given to the displacement member 126. Then, with the displacement member 126 moved rightward to the position where the rack member 126c engages the gear 117, when the gear 93 rotates in the clockwise direction, the gear 115 is rotated in the counterclockwise direction. Such counterclockwise movement of the gear 115 causes counterclockwise movement of the gear 117 under the action of the clutch mechanism 114 which in turn causes the displacement member 126 to move to the left by the engagement of the rack member 126d with the gear 117 until the rack member 126c is brought into meshing engagement with the gear 113 and the rack member 126d is taken out of the meshing engagement with the gear 117. The engagement of the rack member 126c with the gear 113, in this case, also has no effect on the displacement member 126 because of the clutch mechanism being ineffective.

A rocking member 128 is movably mounted on a pin 129 planted on the above-described lever 119, said rocking member 128 being always urged by a spring 130 to turn in a clockwise direction. The amount of clockwise movement of the rocking member 128 is limited by the engagement of a bent portion 119a3 of the lever 119 with a lug 128a of the rocking member 128. The rocking member 128 has another lug 128b for engagement with a bent portion 126e of the displacement member 126. The relationship between the rocking member 128 and the displacement member 126 is that when the displacement member 126 is in a leftward displaced position, the bent portion 126e of the displacement member is positioned on the left side of the second lug 128b of the rocking member. When the displacement member 126 is moved to the left, the bent portion 126e hits against the lug 128b of the rocking member 128. Since the rocking member 128 is arranged for counterclockwise movement against the force of the spring 130, as the bent portion 126e runs over it, the displacement member 126 is further moved to the left. On the other hand, when the displacement member 126 is moved from the leftmost position to the right, abutting of the bent portion 126e against the lug 128b occurs again. In this case, however, since the rocking member is restrained from clockwise rotation by the bent portion 119a3 of the lever 119 engaging the lug 128a of the rocking member 128, when the bent portion 126e runs over the lug 128b, therefore, the lever 119 is turned about the pin 120 in the clockwise direction. Such clockwise movement of the lever 119 causes the engagement portion 119b1 to move away from the cutout 111a of the flange 111, and also causes the slide 106 to move to the right, wherein the flange 108a is released from arresting engagement with the end 106b of the slide 106, returning to the initial position. When the displacement member 126 is fully moved to the right, and when the engagement of the bent portion 126e with the lug 126c is released, the lever is turned again in the counterclockwise direction by the action of the spring 125 until the end 106b of the slide 106 abuts against the periphery of the flange 18a. At this time, the engagement portion 119b1 of the lever 119 reaches a position just before the entrance into the cutout 111a, and is held therein.

A lever 75 is pivoted at a stationary shaft 76 fixed to the camera housing 1. The lever 75 has a bent portion 75d engageable with a bent portion 126d'' of the above-described rack member 126, and has a protrusion 75b arranged to be engageable with the portion 40c of the head pad support member 40 when the lever 75 is turned in a counterclockwise direction. A spring 77 is held at one end thereof on a portion 1d of the camera housing 1 and at the other end on the lever 75 to urge the lever 75 in a clockwise direction. The amount of the clockwise movement of the lever 75 is limited by the shoulder of the lever 75 abutting on the portion 1d of the camera housing 1.

The operation of the overlap exposure control mechanism of the sound motion picture camera of such construction will be explained below. Since a sequence control circuit for controlling the operation of the overlap exposure control mechanism of the camera of the pretent invention is disclosed in the above-identified U.S. patent application Ser. No. 929,240, the camera of the invention is assumed to use the sequence control circuit shown therein.

When the trigger button 16 is operated, the camera records a motion picture with sound accompaniments, the concurrent position of the various mechanisms being shown in FIG. 3. In this position, the head pad support member 40 is moved upwards by the previously explained action, and the head pad 26 presses the film F2 against the magnetic head 27. Then, when the overlap actuation button 5 is depressed, as has been mentioned above, the slide 106 is displaced to the left as viewed in the FIG. 3, thereby the switch SW1 is closed. Then, the lever 119 is turned in the counterclockwise direction, bringing the detent pawl 119a1 into engagement with one of the teeth 97c of the take-up shaft 97. Therefore, the take-up shaft 97 is unable to drive the take-up reel C1c or C2c of the film cassette C1 or C2 for winding up of the film. Such procedure corresponds to the first step described above where the exposed portion of the film F1 or F2 is accumulated in slack form in the interior of the cassette.

The closure of the switch SW1 actuates a computer circuit (not shown). In a certain time interval, the current supply to the electromagnetic device PMg is cut off, and, at the same time, the direction of rotation of the motor MF is reversed to start the above-described second step. Reverse motion of the motor MF is transmitted through the gear train to the gear 117, so that as the gear 117 engages the rack member 126c, the displacement member 126 is suddenly displaced to the left as shown in FIG. 4. Such leftward movement of the displacement member 126 causes the bent portion 126d' of the rack member 126d to turn the lever 75 in engagement at the bent portion 75d therewith against the force of the spring 77, which in turn causes the head pad support member 40 to move downwards. Thus, the head pad 26 is moved away from the magnetic head 27. This state is maintained unchanged throughout the second step. On the other hand, since, throughout the second step, the current supply to the electromagnetic device PMg continues to be cut off, the pinch roller 52 is also moved away from the capstan 28. Then, when the motor MF rotates in the forward direction again to start the third step, motion of the motor MF is transmitted to the gear 113 so that as the gear 113 engages the rack member 126d, the displacement member 126 is suddenly displaced to the right. Such rightward movement of the displacement member 126 causes clockwise movement of the lever 119 through the rocking member 128. Thus, the overlap mechanism is reset as has been mentioned above. Since, at the same time, the lever 75 is released from depression by the rack member 126d, the head pad support member 40 is displaced to the position where the head pad 26 presses the film against the magnetic head 27.

As has been explained below, the present invention provides a sound motion picture camera capable of overlapping exposures in three steps with automatic sequence control, the first step beginning with the stoppage of the take-up spool in the cassette from further rotation at the time of initiation of overlapping exposure operation and terminating with a predetermined length of film accumulated in the interior of the cassette in the slack form, the second step of rewinding the length of slacked film in the first step without exposure of the film, and the third step of transporting the rewound film in the forward direction again while the film is exposed again. The camera is provided with control means responsive to the start of the above-described second step for releasing the head pad from compressive contact with the magnetic head and responsive to the start of the above-described third step for bringing the head pad into the compressive contact with the magnetic head again, thereby giving the advantage that the operation of the camera is very simple. Another advantage is that, as the above-described rack members 126c and 126d are in contact with the slide member 126 under the action of the springs 126c1 and 126d1, very accurate engagement with the drive gears can be assured.

What is claimed is:

1. A sound motion picture camera capable of overlapping film exposures including:
    a camera housing;
    a film chamber formed in said housing for receiving a sound film to be exposed;
    a film chamber cover secured to said housing for opening and closing movement relative to said film chamber;
    a motor rotatable in either of a forward film transport direction and a rewind direction;
    a magnetic head for recording sound on said film;
    a head pad and a movable member for supporting said head pad;
    a spring for urging said head pad in a direction to abut against said magnetic head;
    an operating member mounted on said camera housing to be manually operated;
    a first displacement member for moving said movable member in response to operation of said operating member between a first position whereat said head pad is pressed against said magnetic head and a second position whereat said head pad is spaced apart from said magnetic head;
    actuating means for controlling an overlap film exposure operation;
    means responsive to said actuating means for rotating said motor in the film rewind direction;
    a second displacement member mounted for movement in response to rotation of said motor in the film rewind direction; and
    means for moving said head pad away from said magnetic head in response to movement of said second displacement member irrespective of the movement of said first displacement member.

* * * * *